(12) United States Patent
Huang et al.

(10) Patent No.: US 7,609,956 B2
(45) Date of Patent: Oct. 27, 2009

(54) COMPACT CAMERA MODULE

(75) Inventors: Huei-Min Huang, Taipei (TW); Wei-Pang Lee, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 306 days.

(21) Appl. No.: 11/656,493

(22) Filed: Jan. 23, 2007

(65) Prior Publication Data
US 2007/0212060 A1  Sep. 13, 2007

(30) Foreign Application Priority Data
Mar. 8, 2006  (TW) .............................. 95107793 A

(51) Int. Cl.
G03B 17/00  (2006.01)
(52) U.S. Cl. ........................................... 396/85
(58) Field of Classification Search ............. 396/85–88, 396/72, 79, 463, 301, 464, 71, 103, 133; 359/824, 703, 705, 819; 348/372, 374, 373, 348/240.99, E5.025
See application file for complete search history.

(56) References Cited

U.S. PATENT DOCUMENTS

| 4,733,261 A | 3/1988 | Gunshi et al. |
| 5,241,422 A * | 8/1993 | Shimada et al. ............. 359/694 |
| 5,499,143 A | 3/1996 | Sakamoto et al. |
| 6,594,450 B1 | 7/2003 | Kao |
| 6,978,088 B2 | 12/2005 | Nomura |
| 7,430,368 B2 * | 9/2008 | Lee .............................. 396/76 |

FOREIGN PATENT DOCUMENTS

| JP | 63316029 | 12/1988 |
| JP | 2004-198684 | 7/2004 |
| TW | 1232310 | 5/2005 |
| TW | 1235872 | 7/2005 |

* cited by examiner

Primary Examiner—Reena Aurora
(74) Attorney, Agent, or Firm—Muncy, Geissler, Olds & Lowe, PLLC

(57) ABSTRACT

A compact camera module includes multiple hollow cylinders, a voice coil motor and a torsion spring. An intervening cylinder is mounted on a base. An upright rail is disposed on the intervening cylinder and perpendicular to a support plane of the base. An inner cylinder has a zoom lens inside and at least one moving component, wherein the inner cylinder is disposed in a hollow space of the intervening cylinder and the moving component slides within the upright rail. An outer cylinder is disposed around the intervening cylinder. The outer cylinder has a sloping rotational rail supporting the moving component. A wire coil is secured around the outer cylinder. A torsion spring encircles the outer cylinder and is secured to the base and the wire coil at two ends. A magnet-generating device is disposed around the wire coil and secured on the base.

10 Claims, 9 Drawing Sheets

COMPACT CAMERA MODULE

RELATED APPLICATIONS

The present application is based on, and claims priority from, Taiwan Application Serial Number 95107793, filed on Mar. 8, 2006, the disclosure of which is hereby incorporated by reference herein in its entirety.

BACKGROUND

1. Field of Invention

The present invention relates to a compact camera module (hereafter CCM). More particularly, the present invention relates to a compact camera module with a voice coil motor.

2. Description of Related Art

Various portable electronic devices, such as cell phones and PDAs, have recently been equipped with CCMs so that many portable electronic devices can be used to take photos.

CCMs, like conventional camera modules, need power to adjust their zoom lens so as to take better photographs. A conventional CCM uses a voice coil motor to drive its zoom lens and needs spring or metal wire to guide the zoom lens.

However, the zoom lens can easily tilt or the CCM malfunction when there is an impact (i.e. the portable electronic device hits the ground) applied to the fragile guide structure made of spring or metal wire.

SUMMARY

It is therefore an objective of the present invention to provide a compact camera module that can overcome the drawbacks of a fragile guide structure made merely of spring or metal wire.

In accordance with the foregoing and other objectives of the present invention, a compact camera module includes multiple hollow cylinders, a voice coil motor and a torsion spring. An intervening hollow cylinder is mounted on a base. At least one upright rail is disposed on the intervening cylinder and perpendicular to a support plane of the base. A hollow inner cylinder has a zoom lens inside and at least one moving component wherein the inner cylinder is disposed in the hollow space of the intervening cylinder and the moving component slides within the upright rail such that the direction of motion of the inner cylinder is perpendicular to the support plane of the base. A hollow outer cylinder is disposed around the intervening cylinder. The hollow outer cylinder has a sloping rotational rail supporting the moving component. At least one wire coil is secured around the outer cylinder. At least one torsion spring encircles the outer cylinder and is secured to the base and the wire coil at two ends. A magnet-generating device (including a yoke and a magnet) is disposed around the wire coil and secured on the base. When the wire coil is electrified, an interaction between the magnetic field of the wire coil and the magnetic field of the magnet-generating device causes the outer cylinder to rotate. The rotated rotation rail raises or lowers the moving component along the upright rail so as to raise or lower the inner cylinder and the zoom lens inside thereof. The rotated outer cylinder further deforms the torsion spring. When the wire coil is not electrified, the deformed torsion spring drives the outer cylinder to rotate to an original position.

According to another preferred embodiment, the wire coil and the magnet swap position. In particular, the magnet is secured to the outer wall of the outer cylinder and the wire coil is attached to the inner wall of the yoke. Thus, the torsion spring is not electrically connected with the magnet, and the wire coil inside the yoke is electrically connected with the electrode pin so it can be electrified.

Thus, the CCM of the present invention uses a voice coil motor as a drive source, multiple hollow cylinders as a guide structure, and a torsion spring as a recovery force so as to overcome the drawbacks of a fragile guide structure made merely of spring or metal wire.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
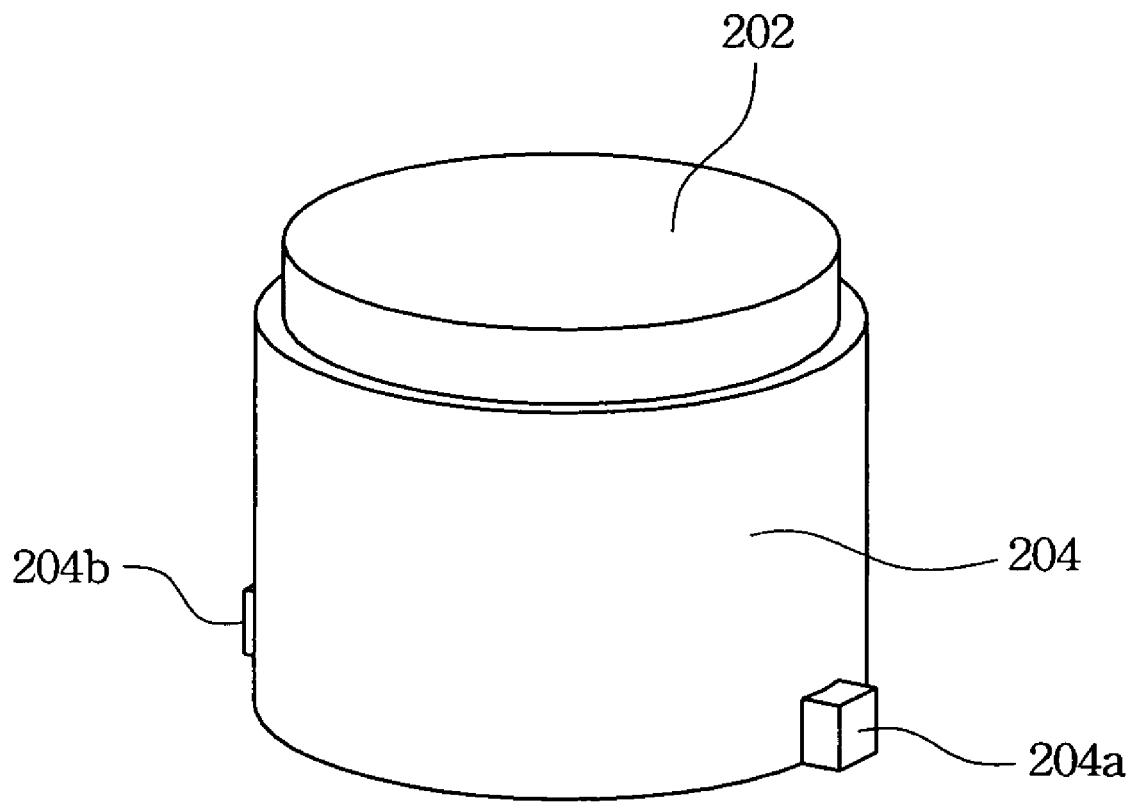
FIGS. 1-7 illustrate a sequence of perspective views of assembling a CCM components together according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

Figure 7:
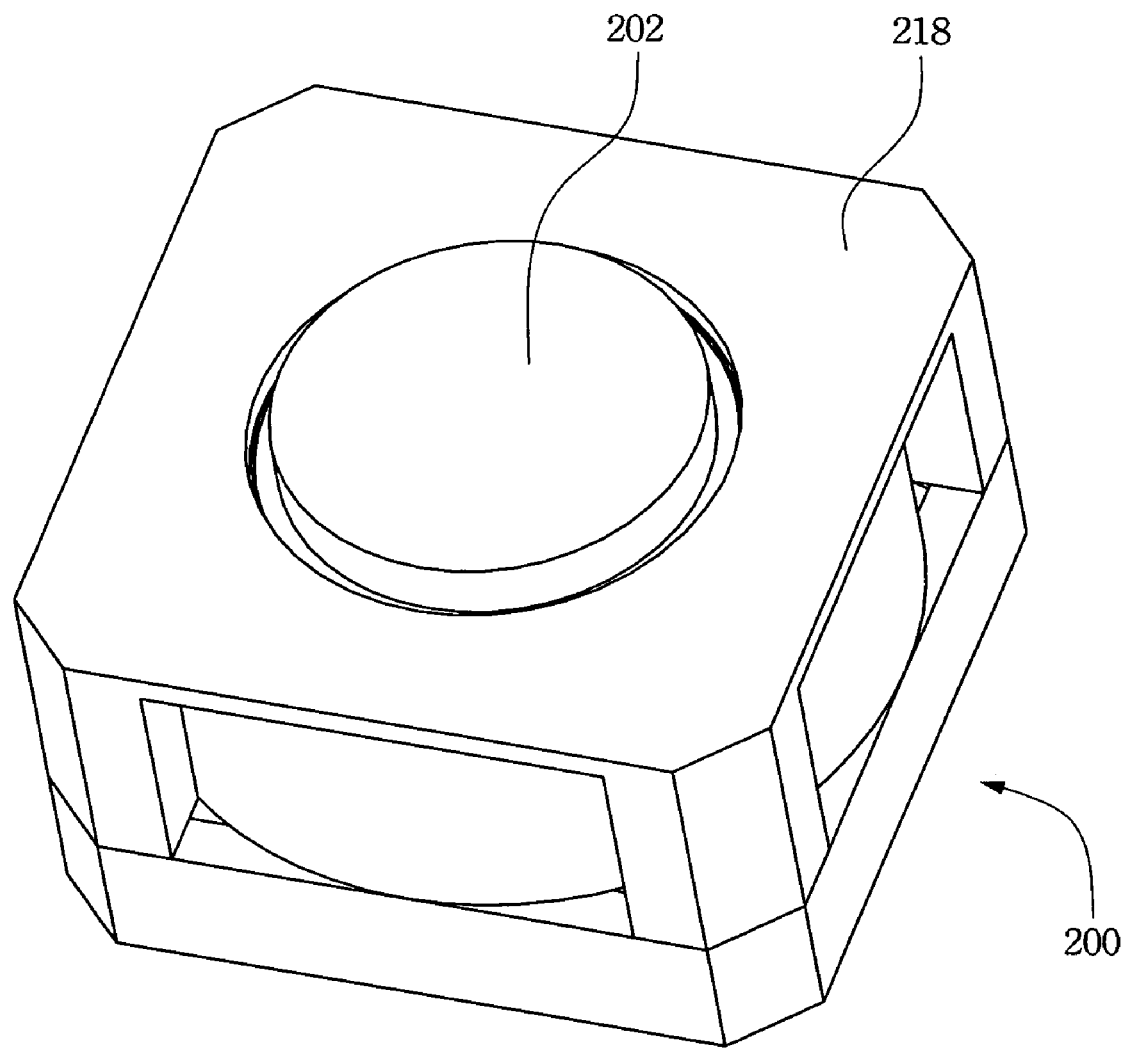

FIG. 7 illustrates a perspective view of a CCM according to one preferred embodiment of this invention. Referring to FIG. 7, a CCM 200 can be installed in any portable electronic device, which desires a photo snapping function. A zoom lens 202 is also provided to obtain a better photograph.

Figure 8:
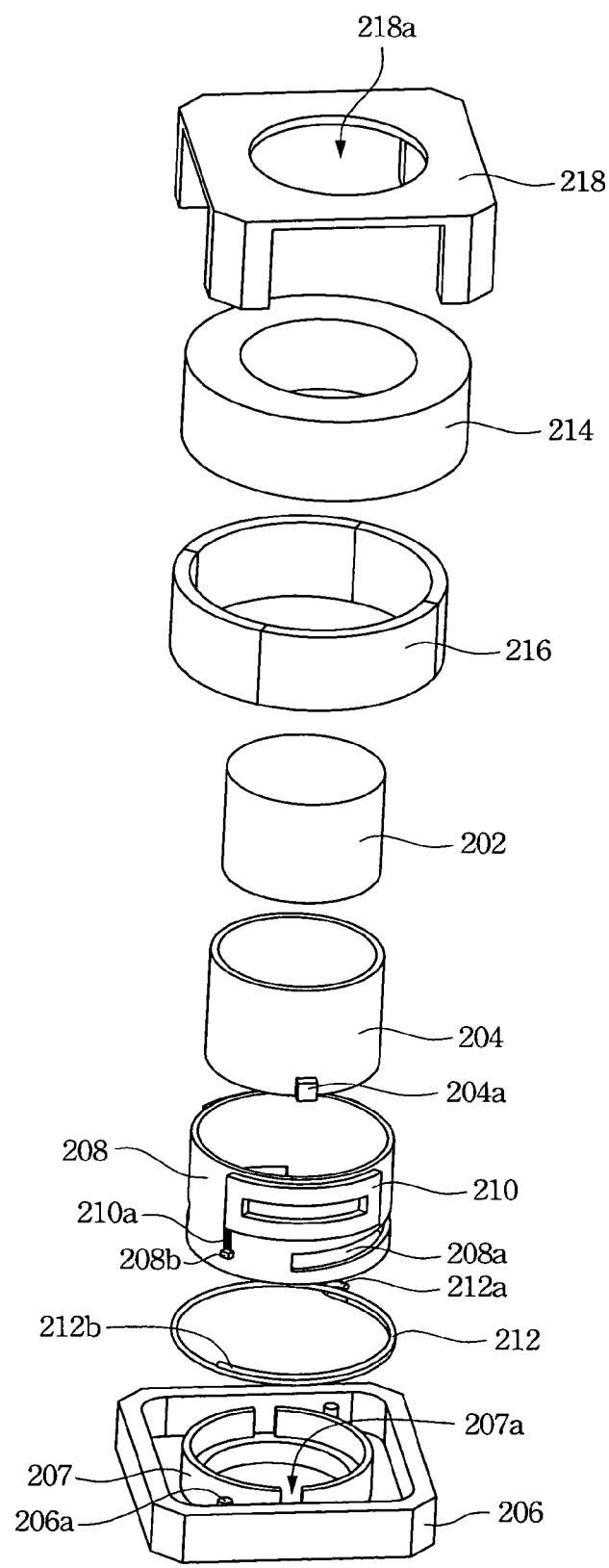
FIG. 8 illustrates an exploded view of a CCM according to one preferred embodiment of this invention.

FIGS. 1-7 illustrate a sequence of perspective views of assembling CCM components together according to one preferred embodiment of this invention. FIG. 8 illustrates an exploded view of a CCM according to one preferred embodiment of this invention.

Referring to FIG. 1 and FIG. 8, the zoom lens 202 is secured to a hollow inner cylinder 204, which has moving components 204a and 204b on its outer walls.

Figure 2:
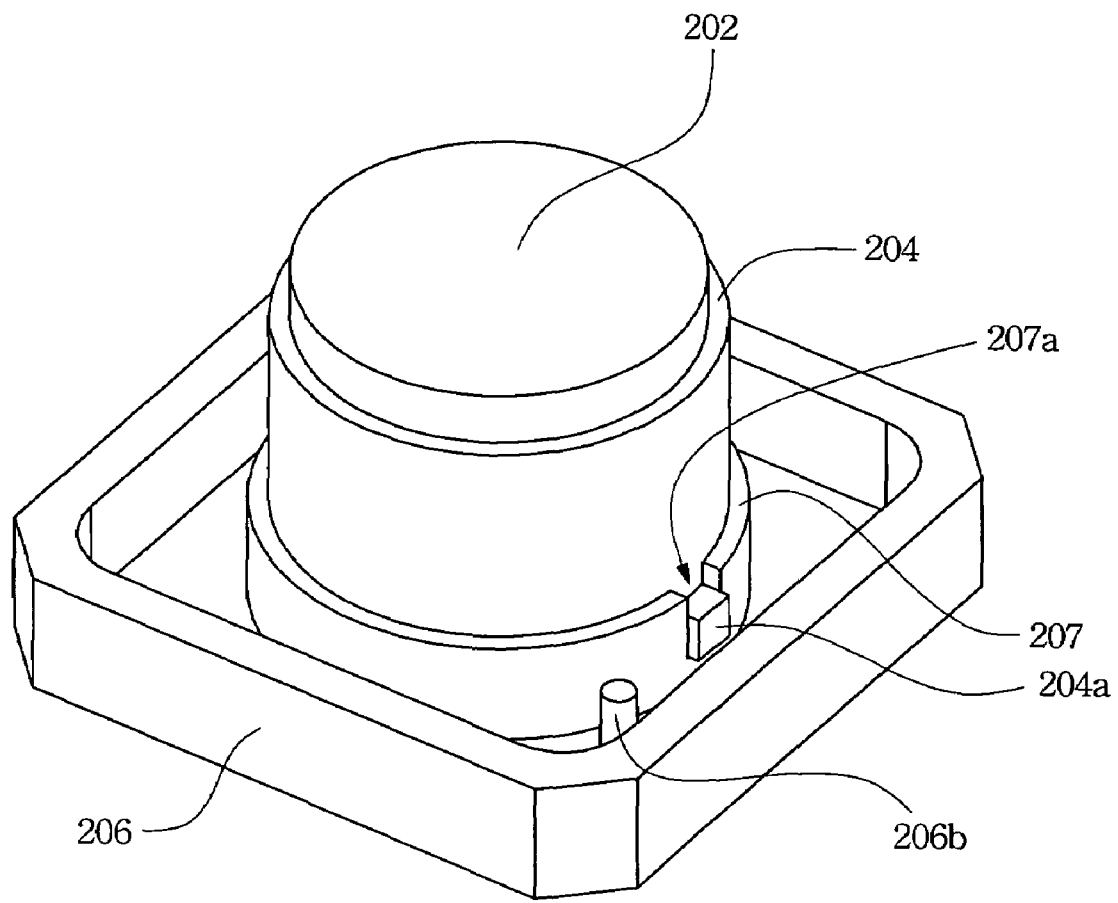

Referring FIGS. 2 and 8, the inner cylinder 204 fits into a hollow intervening cylinder 207 of a base 206, and two moving components 204a fit into an upright rail 207a. The upright rail 207a is a strip-shaped cutout of the intervening cylinder 207. The strip-shaped cutout is perpendicular to the support plane of the base 206. The intervening cylinder 207 is also mounted on the support plane of the base 206. The upright rails 207a allow the moving components 204a and 204b to move up and down (perpendicular to the support plane of the base 206). Therefore, the zoom lens 202 can also move up and down. The base further includes two electrode pins 206b so as to provide power.

Figure 3:
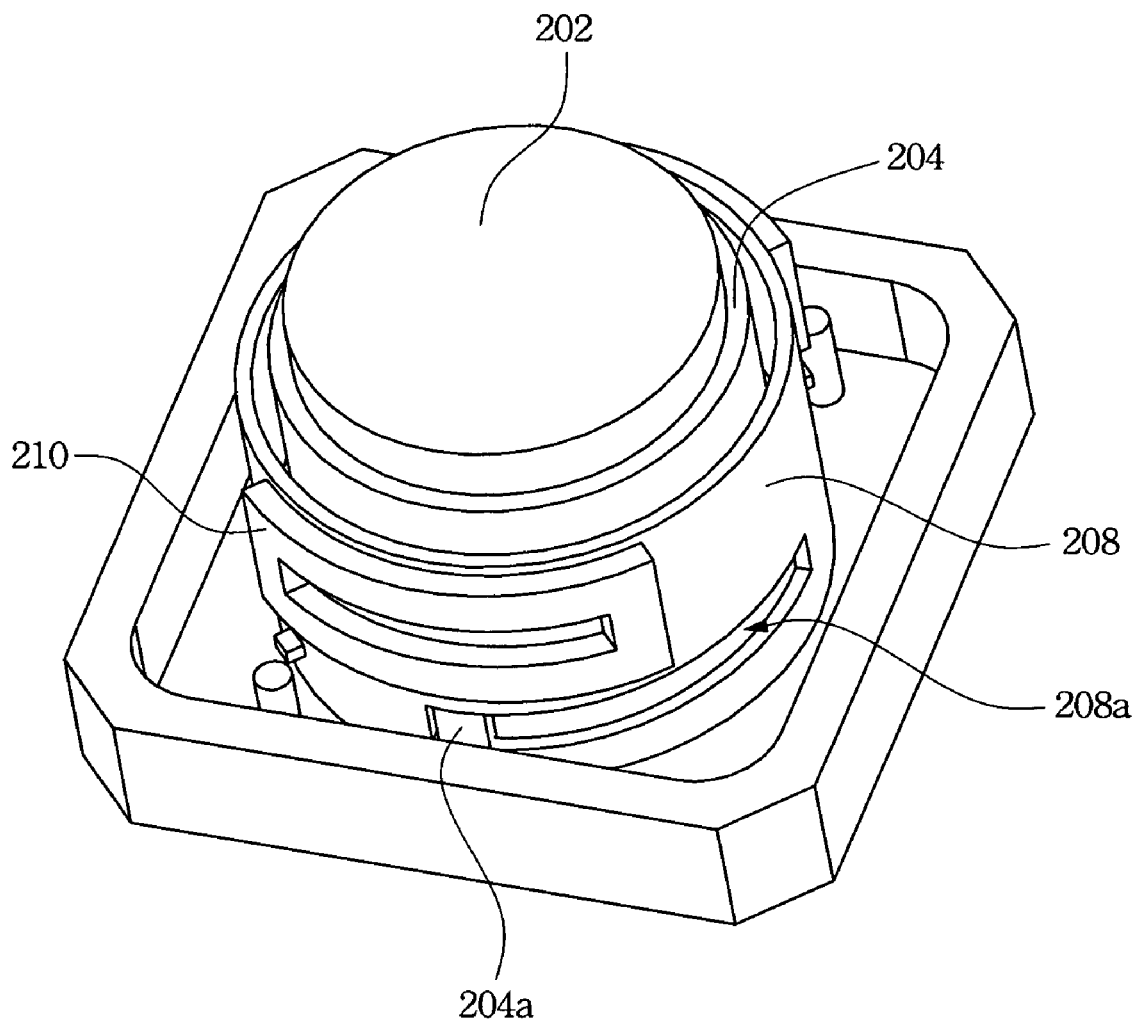

Referring to FIGS. 3 and 8, a hollow outer cylinder 208 is disposed around the intervening cylinder 207, and the moving component 204a (sticking out of the intervening cylinder 207) fits into a rotation rail 208a. The outer cylinder 208 can be rotated in relation to the inner cylinder 204 or the intervening cylinder 207. Because the rotation rail 208a is a sloping strip-shaped cutout of the outer cylinder 208, the rotated rotation rail 208a can raise or lower the moving component 204a. The moving component 204a moves up or down (perpendicular to the support plane of the base 206) due to limitations on the upright rail 207a. The inner cylinder 204 and the zoom lens 202 are hence moved up or down. Wire coils 210 are secured to an outer wall of the outer cylinder 208.

Figure 4:
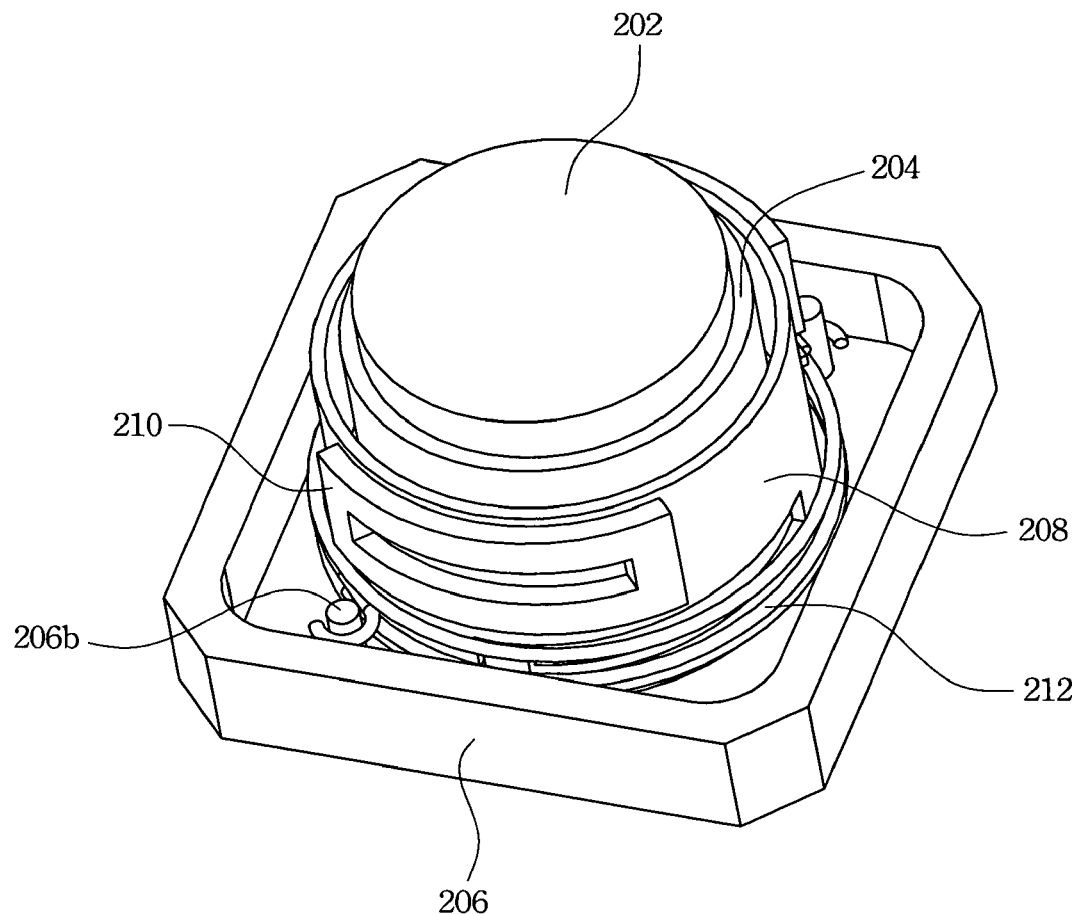

Referring to FIGS. 4 and 8, a torsion spring 212 encircles the outer cylinder 208. One end 212a of the torsion spring 212 is secured to the electrode pin 206b, the other end 212b is soldered to a contact electrode 208b on the outer cylinder 208, and is further electrically connected with the wire coil 210 by a connection member 210a. Two torsion springs 212 are used in this preferred embodiment to link the outer cylinder 208 and the base 206. The torsion spring 212 can provide a recovery force to the rotated outer cylinder 208 and serve as an electrical conductor for electrifying the wire coil 210.

Figure 5:
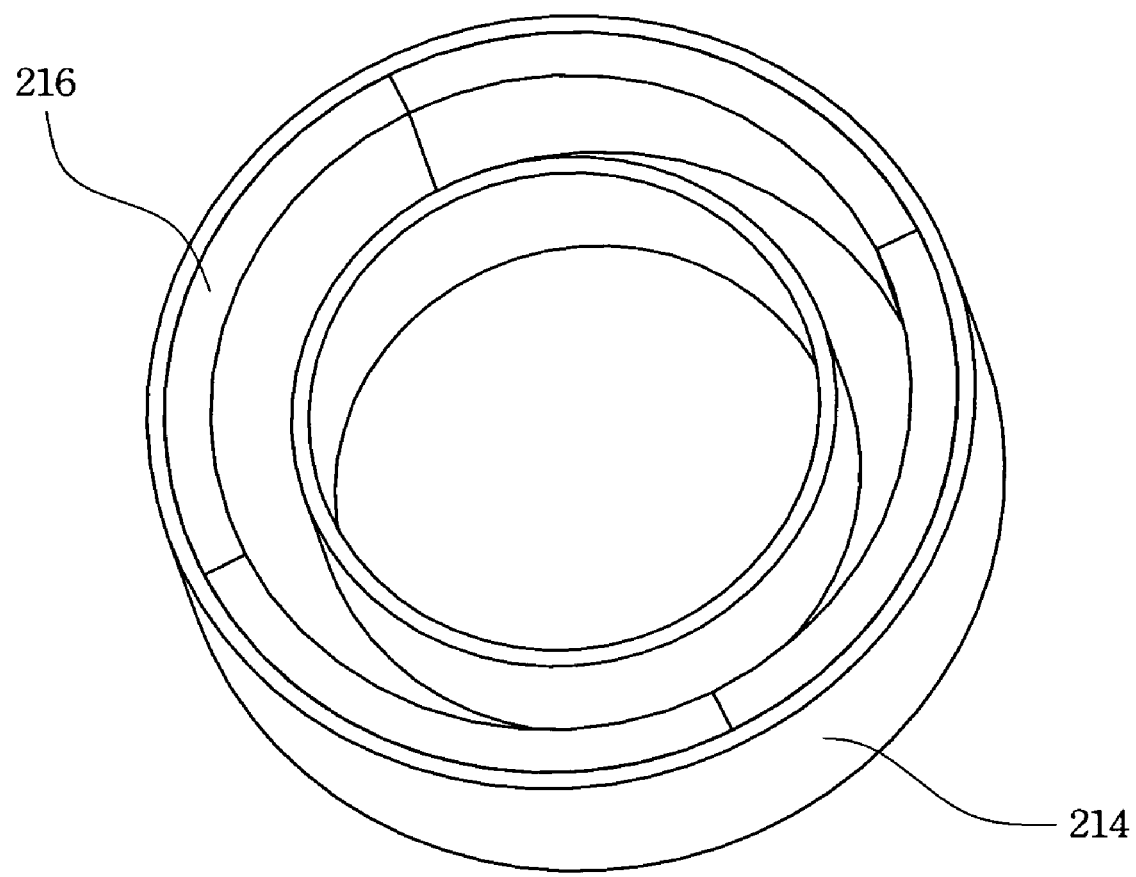

Referring to FIGS. 5 and 8, a hollow cylinder-shaped yoke 214 includes magnets 216 attached to its inner walls.

Figure 6:
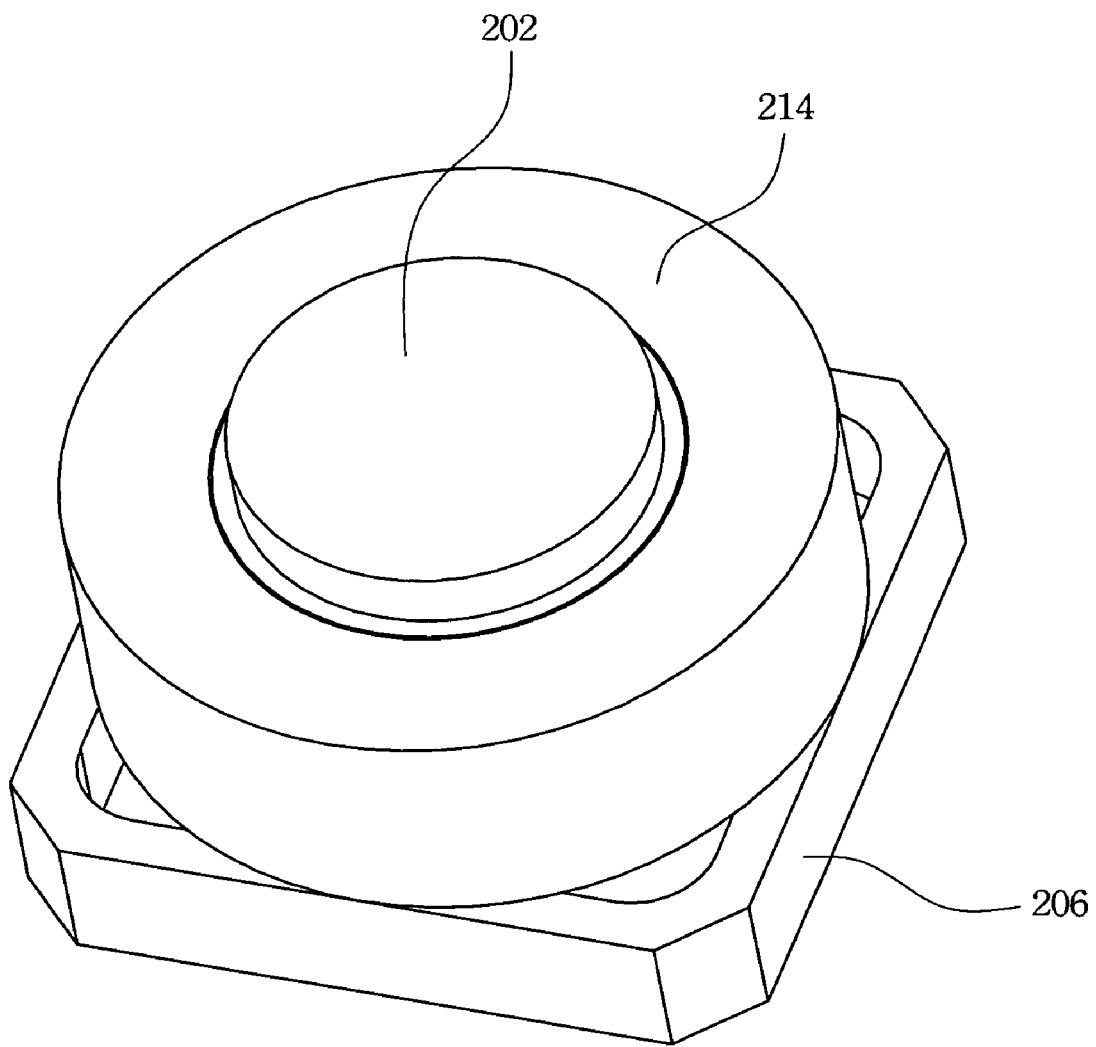

Referring to FIGS. 6 and 8, the yoke 214 of FIG. 5 is flipped and mounted on the base 206. The hollow cylinder-shaped yoke 214 is disposed around the wire coil 210 and exposes the zoom lens 202.

Referring to FIGS. 7 and 8, a cover 218 is finally mounted on top of the base 206, and exposes the zoom lens 202 by an opening 218a.

When the wire coil 210 is electrified with power through the connection component 210a and the torsion spring 212, an interaction between the magnetic field of the wire coil 210 and the magnetic field of the magnet generating device (the yoke 214 and the magnet 216) drives the outer cylinder 208 to rotate. The rotated rotation rail 208a raises or lowers the moving component 204a along the upright rail 207a so as to raise or lower the inner cylinder 204 and the zoom lens 202 inside thereof. The rotated outer cylinder 208 also deforms the torsion spring 212.

When the wire coil 210 is not electrified, the deformed torsion spring 212 drives the outer cylinder 208 to rotate to an original position. The zoom lens 202 inside thereof also moves up or down so as to execute its intended function.

Figure 9:
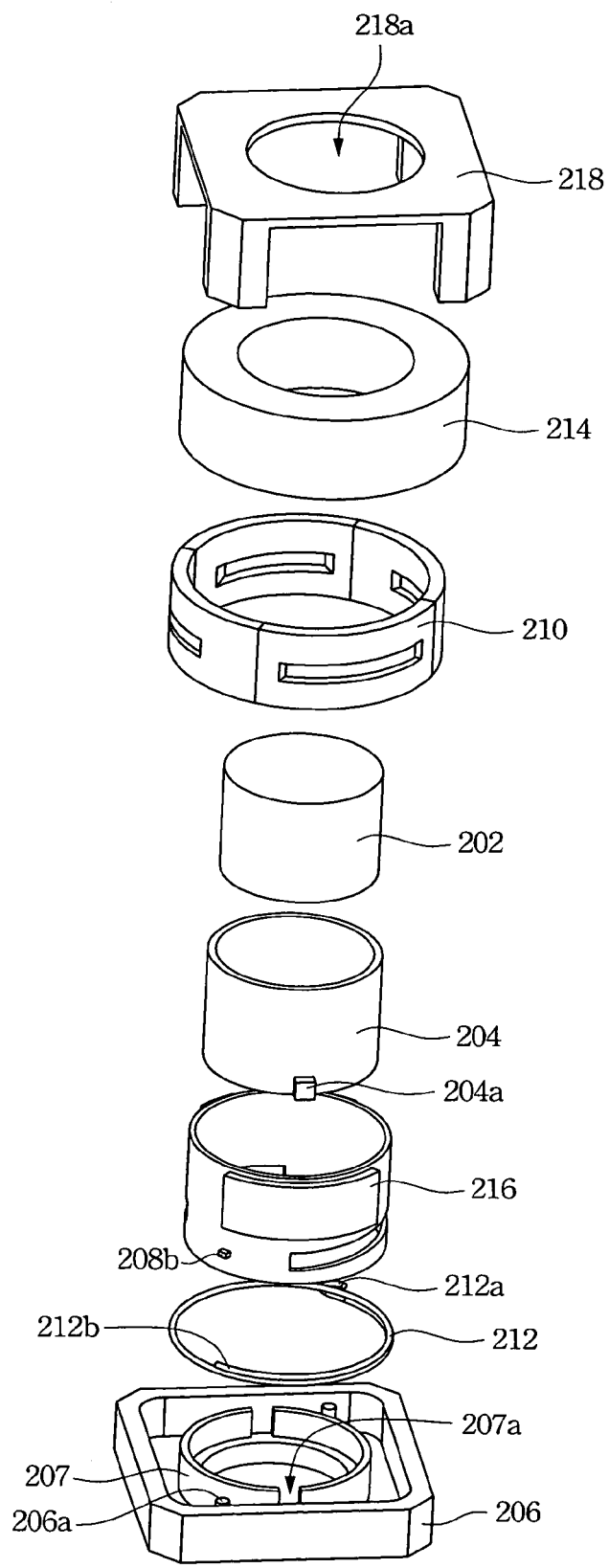
FIG. 9 illustrates an exploded view of a CCM according to another preferred embodiment of this invention.

FIG. 9 illustrates an exploded view of a CCM according to another preferred embodiment of this invention. This preferred embodiment is similar to the preferred embodiment of FIG. 8 except that the wire coil 210 and the magnet 216 swap positions. In particular, the magnet 216 is secured to the outer wall of the outer cylinder 216 and the wire coil 210 is attached to the inner wall of the yoke 214 in this preferred embodiment. Thus, the torsion spring 212 is not electrically connected with the magnet 216, and the wire coil 210 inside the yoke 214 is electrically connected with the electrode pin 206a to be able to be electrified.

The wire coil 210 and the magnet 216 of FIGS. 8 and 9 are the main components of the so-called voice coil motor.

According to preferred embodiments, the CCM of the present invention uses a voice coil motor as a drive source, multiple hollow cylinders as a guide structure, and a torsion spring as a recovery force so as to overcome the drawbacks of a fragile guide structure made merely of springs or metal wire.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A compact camera module, comprising:

a base, having an intervening cylinder;

at least one upright rail, disposed on the intervening cylinder and perpendicular to a support plane of the base;

an inner cylinder, having a zoom lens inside and at least one moving component, wherein the inner cylinder is disposed in a hollow space of the intervening cylinder and the moving component slides within the upright rail;

a hollow outer cylinder, disposed around the intervening cylinder, the hollow outer cylinder having a sloping rotation rail applied to the moving component for sliding;

at least one wire coil, secured around the outer cylinder;

at least one torsion spring, encircling the outer cylinder and secured to the base and the wire coil at two ends; and a magnet-generating device, disposed around the wire coil and secured on the base, when the wire coil is electrified, an interaction between the magnetic field of the wire coil and the magnetic field of the magnet-generating device rotates the outer cylinder, the sloping rotation rail raises or lowers the moving component along the upright rail so as to raise or lower the inner cylinder and the zoom lens inside thereof, the rotated outer cylinder deforms the torsion spring, when the wire coil is not electrified, the deformed torsion spring drives the outer cylinder to rotate to an original position.

2. The compact camera module of claim 1, wherein the upright rail is a strip-shaped cutout of the intervening cylinder.

3. The compact camera module of claim 1, wherein the rotation rail is a strip-shaped cutout of the outer cylinder.

4. The compact camera module of claim 1, further comprising a cover disposed on top of the base and exposing the zoom lens.

5. The compact camera module of claim 1, wherein the magnet-generating device includes a hollow cylinder-shaped yoke and at least one magnet, the magnet is attached on an inner wall of the hollow cylinder-shaped yoke.

6. The compact camera module of claim 1, wherein the wire coil is electrified by the power through the torsion spring.

7. A compact camera module, comprising:

a base, having an intervening cylinder;

at least one upright rail, disposed on the intervening cylinder and perpendicular to a support plane of the base;

an inner cylinder, having a zoom lens inside and at least one moving component, wherein the inner cylinder is disposed in a hollow space of the intervening cylinder and the moving component slides within the upright rail;

a hollow outer cylinder, disposed around the intervening cylinder, the hollow outer cylinder has a sloping rotation rail applied to the moving component for sliding;

at least one magnet, secured around the outer cylinder;

at least one torsion spring, encircling the outer cylinder and secured to the base and the wire coil at two ends;

a hollow cylinder-shaped yoke, secured on the base; and at least one wire coil, disposed around the magnet and secured on the hollow cylinder-shaped yoke, when the wire coil is electrified, an interaction between the magnetic field of the wire coil and the magnetic field of the magnet rotates the outer cylinder, the sloping rotation rail raises or lowers the moving component along the upright rail so as to raise or lower the inner cylinder and the zoom lens inside thereof, the rotated outer cylinder deforming the torsion spring, when the wire coil is not electrified, the deformed torsion spring drives the outer cylinder to rotate to a original position.

8. The compact camera module of claim 7, wherein the upright rail is a strip-shaped cutout of the intervening cylinder.

9. The compact camera module of claim 7, wherein the rotation rail is a strip-shaped shaped cutout of the outer cylinder.

10. The compact camera module of claim 7, further comprising a cover disposed on top of the base and exposing the camera.

* * * * *